United States Patent
Renshaw (10) Patent No.: US 7,069,538 B1
(45) Date of Patent: Jun. 27, 2006

(54) FORM DATA FILES GENERATOR

(75) Inventor: David Seager Renshaw, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,927

(22) Filed: Dec. 2, 1999

(30) Foreign Application Priority Data

Jun. 10, 1999 (GB) ............................................. 9913404

(51) Int. Cl.
*G06F 9/44* (2006.01)

(52) U.S. Cl. ...................... 717/108; 717/106; 717/118; 717/139; 717/140

(58) Field of Classification Search ......... 717/100–122, 717/140; 377/88.26
See application file for complete search history.

(56) References Cited

U.S. PATENT DOCUMENTS

| | | | | |
|---|---|---|---|---|
| 4,625,081 A | * | 11/1986 | Lotito et al. ............. | 379/88.26 |
| 4,742,467 A | * | 5/1988 | Messerich et al. .......... | 717/114 |
| 5,327,568 A | | 7/1994 | Maejima et al. ............ | 395/800 |
| 5,450,545 A | * | 9/1995 | Martin et al. ............... | 717/109 |
| 5,640,550 A | * | 6/1997 | Coker .......................... | 707/4 |
| 5,892,510 A | | 4/1999 | Law et al. | |
| 5,956,513 A | * | 9/1999 | McLain, Jr. ................ | 717/142 |
| 5,999,729 A | * | 12/1999 | Tabloski, Jr. et al. ....... | 717/103 |
| 6,018,627 A | * | 1/2000 | Iyengar et al. .............. | 717/101 |
| 6,083,276 A | * | 7/2000 | Davidson et al. ........... | 717/107 |
| 6,105,119 A | * | 8/2000 | Kerr et al. ................... | 711/219 |
| 6,237,135 B1 | * | 5/2001 | Timbol ....................... | 717/107 |
| 6,263,492 B1 | * | 7/2001 | Fraley et al. ................ | 717/108 |
| 6,263,498 B1 | * | 7/2001 | Alcorn et al. ............... | 717/103 |

FOREIGN PATENT DOCUMENTS

| | | |
|---|---|---|
| EP | 0564790 | 10/1993 |
| GB | 2331605 | 5/1999 |

\* cited by examiner

*Primary Examiner*—Wei Y. Zhen
*Assistant Examiner*—Chuck Kenadll
(74) *Attorney, Agent, or Firm*—McGuireWoods LLP; John R. Pivnichny (57) ABSTRACT

The invention provides a method, system and computer program product for creating a form definition data file using a visual programming development environment on a computer system. The data file is for interpretation by a dialogue management system and is XML-based markup. A graphical program representation of the data file is created in the development environment and is then compiled and executed in order to generate the data file. The program itself is built by linking a main Java bean component and a plurality of Java bean sub-components, all containing characteristic data file information. On running the executable, the main Java bean outputs its respective data file information into the data file and does this by creating a file output stream and writing its respective data file information to that output stream. This action also causes the next and subsequent java bean components to output their respective data file information into the data file.

31 Claims, 8 Drawing Sheets

```
<form name=stock_purchase>

<prompt id=sp1>
"Please provide the name of the stock and quanitity you
wish to purchase"
</prompt>

<slot name=stock_name>
    <prompt id=spl1>"Which stock do you wish to
buy?"</prompt>
    <process>
        <name>validate_stock</name>
        <response value=1>
            <prompt id=spll>"Sorry, I don't recognise that
stock"</prompt>
        </response>
    </process>
</slot>

<slot name=purchase_quantity>
    <prompt id=sp12>"How many shares do you wish to
buy?"</prompt>
</slot>

<process>
    <name>buy_stock</name>
</process>
</form>
```

FORM DATA FILES GENERATOR

BACKGROUND OF THE INVENTION

1. Field of the Invention

The present invention relates to the field of visual programming and more particularly to the generation of form data files which define electronic forms using such a technology.

2. Description of the Related Art

Computers have proliferated into all aspects of society and are instrumental in the running of both businesses and academic institutions. The home personal computer (PC) has now become the norm and the last few years has seen the advent of increasingly cheaper desktop machines, with greater processing power, memory and storage space. Such advances have been essential to keep pace with the new generation of power-hungry applications currently infiltrating the market-place.

Software has changed quite dramatically in recent years. Command-line and text-based packages, which were at one time common-place, are now paling into insignificance. The consumer is placing increasing demands upon the software developers to invent ever better and more functional tools. The old-style products are now invariably considered unacceptable.

Presentation especially is deemed extremely important in the battle to win over the market. Developers invest a great deal of time and effort in constructing user-friendly and aesthetically pleasing graphical user interfaces (GUIs). The Microsoft Corporation has been particularly successful with Windows 3.1, 95 and 98 and their suite of related products. Indeed a defacto standard has been established, such that a large proportion of PC packages are now Windows-based.

Programming methods have also had to change in order to create these new-style applications. Using the traditional model, an application is created, in one of the well-known text-based languages such As C or COBOL, from a number of components or modules. These contain both the presentation and the business logic. These programs are however restricted in the amount of presentation flexibility that they provide to the user.

The industry has recently invested many millions in the creation of new and more sophisticated programming tools which create traditional style applications, but using a visual environment. Such tools have changed the face of programming. It is now possible to develop complex programs using graphics, icons, animation etc. Such a technique is extremely powerful, since it permits the graphical representation of the programming process.

Recently, the Java Programming language, available from Sun Microsystems, has risen to prominence. Java is a platform-independent, object-orientated language, with client/server functionality. It supports concurrency, enabling "real world" objects to do their work simultaneously. Java Beans describe the Java objects which are suitable for use in a visual development environment. Recently many sophisticated visual programming environments have been developed to support the Java component model of Java Beans. These tools are the state of the art and are able to exploit the great flexibility and platform independence of Java and Java Beans. One of these is the IBM VisualAge for Java product. Further information about the Java programming language may be obtained from "Teach Yourself Java in 21 days" by Laura Lemay and Charles Perkins (Sama.net Publishing, Indianapolis, USA, 1996) and "Simple Solutions, Essential Skills—Using Java 1.2" by Mike Morgan (published by Que, ISBN—0-7897-1627-5). Http://java.sun.com also provides a good source of information.

Figure 1:
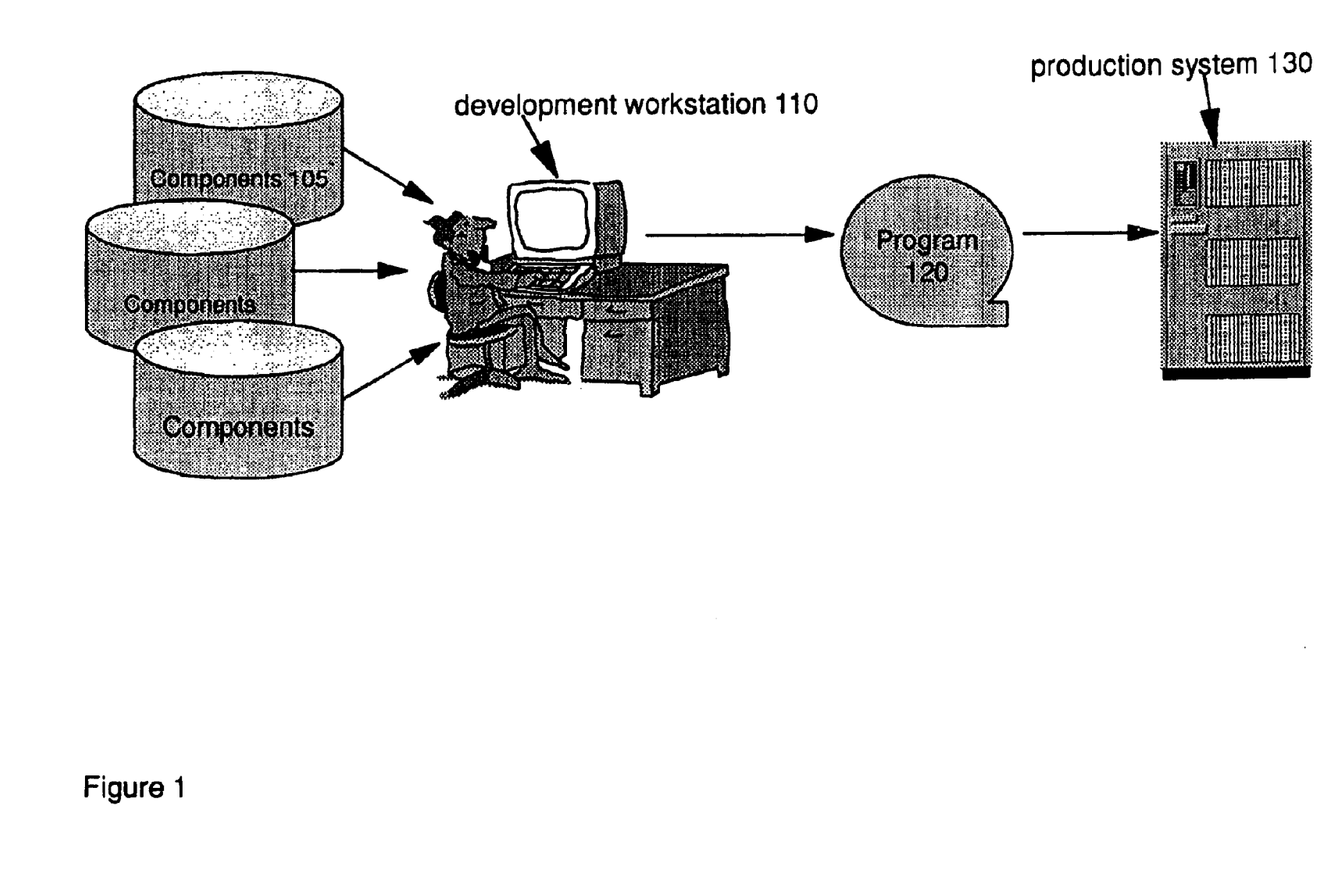
FIG. 1 illustrates a conceptual overview of the creation of conventional applications by assembly from a plurality of components or modules.

Today applications are created, by assembly, from a range of software components and indeed programmer productivity has been greatly increased through the use of software componentry. FIG. 1 illustrates a conceptual overview of this process. The components 105 may be provided by different vendors and are assembled with any necessary "glue" code (not shown) using a sophisticated visual programming environment running on a development workstation 110. Within the context of Java, it is the Java Beans which provide this functionality.

The result of the assembly process is a compiled, packaged executable program 120 which may be installed into an execution environment on the production system 130 and executed. The application usually deals with all aspects of user interface or presentation and business logic and is thus either a self-contained entity or closely related to other such applications.

Work on speech and other technologies using natural language understanding (NLU) as an interface to applications has created a yet further model for program execution. The next generation of user interface applications will, in all likelihood, be based around NLU and Dialogue Management (DM) technology and will provide significantly more flexibility to the user.

A Dialogue Manager directs the conversation between a human user and a machine. Based upon the user's response to a prompt for input, the Dialogue Manager decides when and how to carry out various business transactions. Furthermore, it keeps track of the point that the user has reached in the current, and possibly other nested transactions, determining what to present to the user next and how to present results and/or prompt for additional input.

Dependant upon the capabilities of the system, this conversation may be entirely text-based or may take the form of speech. With the latter, the system interprets the speech using NLU techniques. It breaks each sentence down into a string of words, eliminating noise words such as "I", "and", "sit" etc., and infers the meaning of the remaining nouns, adjectives and verbs according to the context in which they occur. The ViaVoice speech recognition software, available from the IBM Corporation, is one example of a product which incorporates a Dialogue Manager with NLU functionality.

Figure 2:
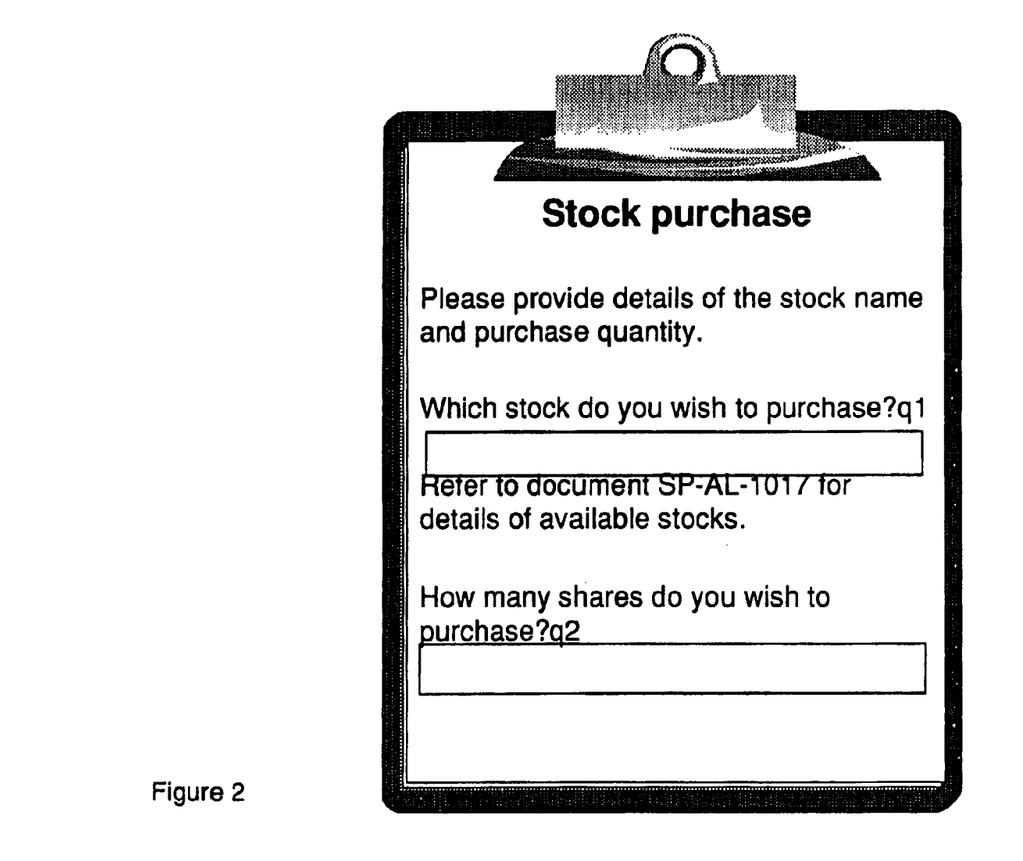
FIG. 2 illustrates a typical paper-based form.

With this new model of application development, the application is not completely programmed or assembled from software components. The current range of "programming" tools are thus largely inappropriate. These new applications will require new ways of defining programs. Often these programs are defined in terms of "forms", akin to the paper forms used in business today, and the relationships between these forms. FIG. 2 illustrates a typical "paper" form. This is a somewhat trivialised example which requires the user to provide just two pieces of information:

i) The name of the stock q1; and
ii) The number of shares required q2

In reality business forms invariably require vast amounts of information from the user and often have inadequate instructions and navigational hints.

The new-style applications are created as a set of electronic "forms", which are then used by a Dialogue Manager to decide when and how to carry out business transactions and how to prompt the user for further input. The forms also define the possible navigational paths through individual transactions and the application set as a whole. Much of the application logic is automated or hidden behind dialogue management software which acts on the form definitions and drives the user interface.

A possible use for the DM technology is a catalogue ordering facility in which a user's query is handled on an entirely automated basis by a computer telephony system/an interactive voice response system (IVR) with added DM functionality. An example of such a system is the DirectTalk for AIX product available from the IBM Corporation.

When a user/customer places a call with the IVR, the system might play a header message asking the customer what action they wish to proceed with. The IVR also supports NLU and can therefore accept a speech-based response. The client might say for example:

"I would like to order a red shirt in a size 12 please".

The NL software would break this sentence down into a series of separate words, thus ending up with the following list: I, would, like, to, order, a, red, shirt, in, a, size, 12, please It would disregard all the noise words, but be programmed to realise that "red" was both an adjective and a colour and that since the noun "shirt" proceeded it, it was likely that this the two were related in some way. Furthermore, it would recognize from the context of the sentence that the number "12" was most probably a size. In this way it would try to gain an understanding as to what it was that the user was requesting.

The Dialogue Manager would then proceed through its current form set, filling in as many fields as possible from the speech input provided by the customer. Each form would rated, with the one missing the least information, scoring highest. In this case the "order form" would score best and the system would deduce from this that the customer was trying to order an item from its catalogue.

The Dialogue Manager would then scour the order form for missing information. In the above example it is not clear whether a lady's or a man's shirt is required. Each "form" contains cues to allow prompting of the user for data, plus linkages to the business objects of the system to execute business transactions. The system would therefore ask this very specific query of the user and this may involve playing the appropriate voice segment down the telephone line.

The forms that the Dialogue Manager interprets need to be defined and these definitions are often created using some form of text mark-up, XML-based or otherwise. Currently there is a significant lack of programmer tools for this job. Much of the technology for the visual composition of programs, which has been developed at considerable cost over recent years, seems likely to become unusable in this new environment. There is little or no tool support for the definition syntax of managed dialogue forms and thus this is a job for the experts only.

Figure 3:
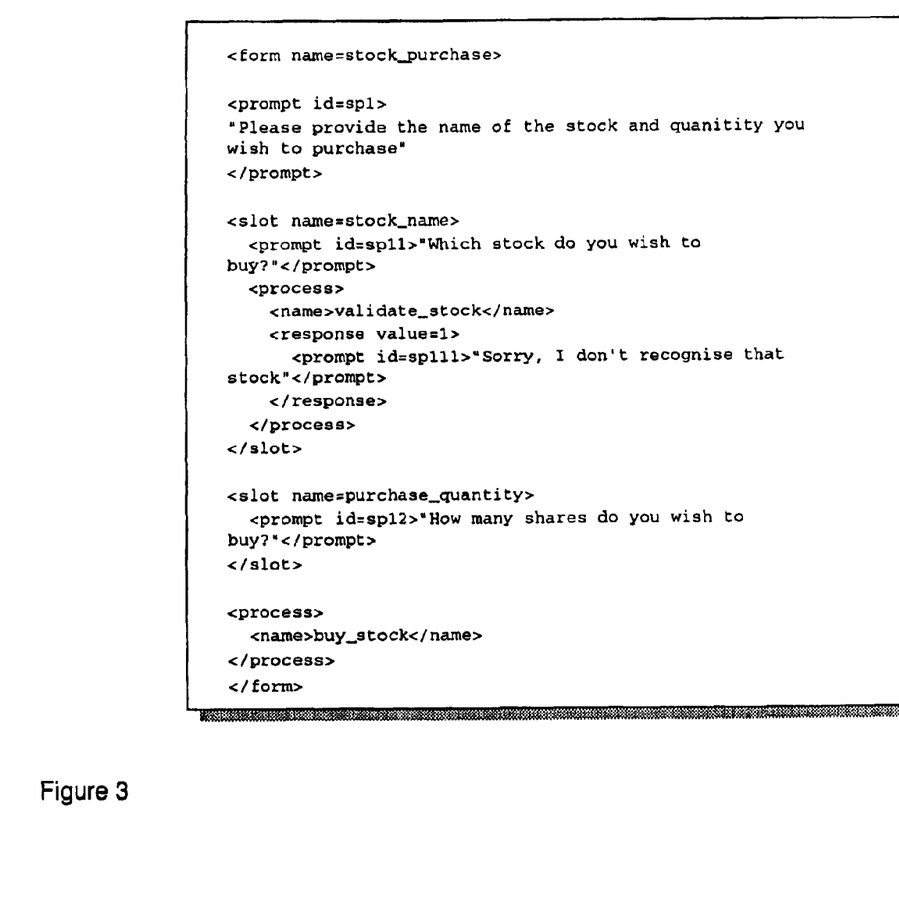
FIG. 3 shows an abstract of the form definition for a managed dialogue application to perform the same task as the paper form of FIG. 2. (It also illustrates a partial picture of the form definitions that the packaged bean 780 of FIG. 7 produces according to a preferred embodiment of the present invention)

FIG. 3 shows an abstract of the form definition for a managed dialogue application to perform the same task as the paper form of FIG. 2. Whilst the syntax of this example is not complete or indeed real, it serves as an example of how a managed dialogue application might be defined. There is no "programming" involved simply the definition of the questions to ask the user and the business processes to run when the data is submitted.

An application may be made up of many such forms and there may be complex relationships between the forms allowing for instance, the stock purchase form to inherit the account number value from the authentication or login form. This is a very different way of producing applications.

Figure 4:
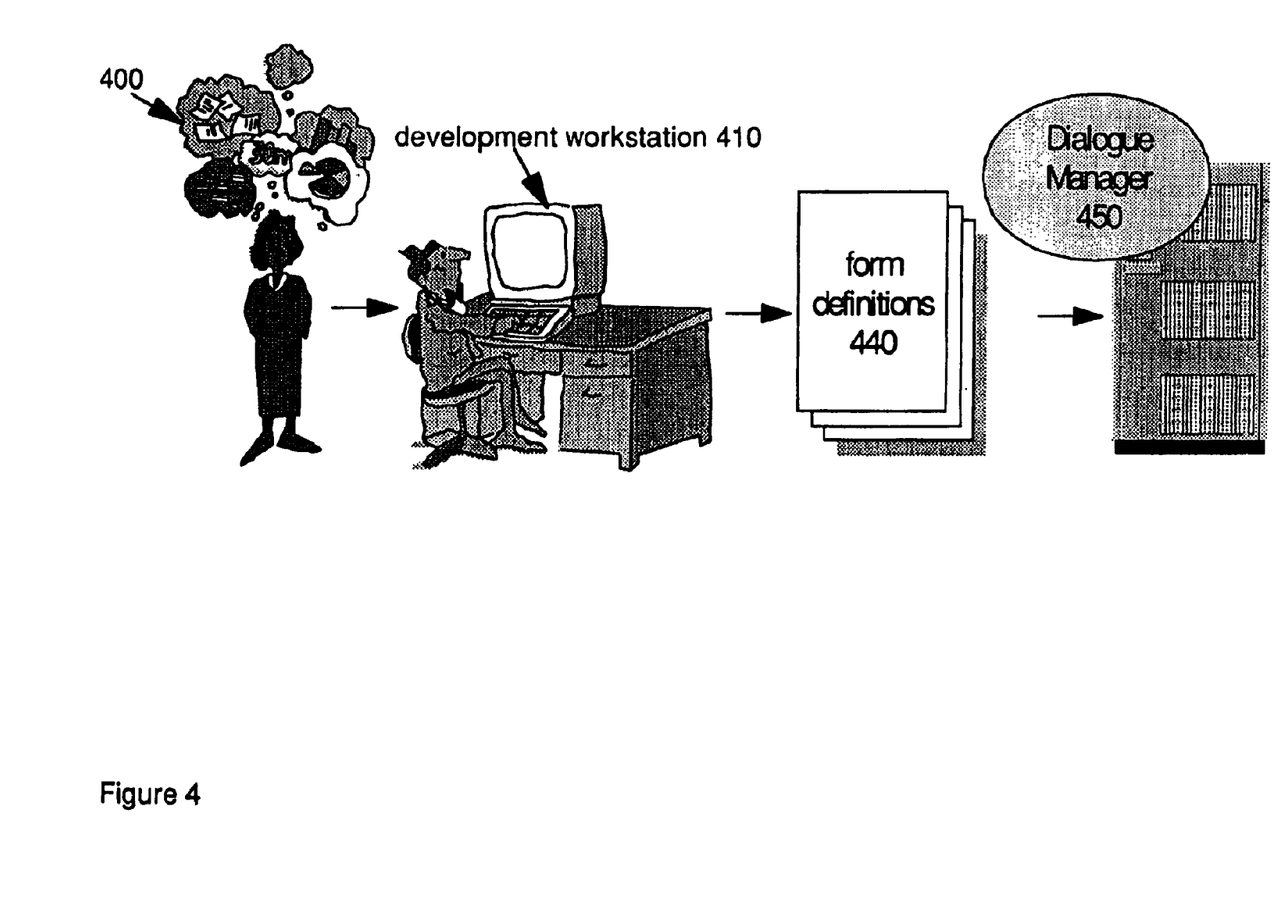
FIG. 4 illustrates a conceptual overview of the development process of a set of form definitions manually according to the prior art.

FIG. 4 illustrates a conceptual overview of the development process. The software developer produces the necessary ideas 400 and creates a set of form definitions 440, based upon these ideas, using the development workstation 410 (ie a text-editor running on the workstation). The definition of the relationships between the forms and between their constituent parts, ie form fields, are manually defined. These are most likely defined in a text mark-up language, XML-based or otherwise, using a basic text editor. The Dialogue Manager 450 then interprets these form definition files. If the system has no NLU functionality, then these form definitions can also define the "look and feel" of the text to be presented to the user. They can contain a number of symbolic references as to how the text should appear (eg links to bitmaps, jpegs etc.).

The process of manually coding the form definition files is not only an extremely arduous task, but the debugging of such applications is currently a very time-consuming and difficult process. It can become near impossible to visualize the complex relationships between the different forms and their constituent part (ie fields) and mistakes are therefore not uncommon.

U.S. Pat. No. 5,784,583, which issued Jul. 21, 1998, relates to a technique by which menus may be created in the form of a visual, tree-like model. Such a technique allows the developer to visualise the overall structure of the menu and hence they are not required to write and compile the code into an application in order to view the menu graphically at runtime. The visual model is then translated into a high level text format which is interpreted in a software application. Conversion of the visual tree into the corresponding menu code is however encapsulated within the development environment.

U.S. Pat. No. 5,651,108, which issued Jul. 22, 1997, discloses a method for creating electronic forms using an object-orientated visual programming language. The form's layout is defined by placing screen objects at desired locations on the canvas. The program logic, which specifies the action taken upon the occurrence of a particular event/input, is attached to the screen objects.

U.S. Pat. No. 5,640,501, which issued Jan. 17, 1997 teaches a method for visually creating and executing goal oriented electronic forms, whereby navigation and completion logic is embedded in the form definition to ensure the operator is only presented with relevant fields. This however is achieved via the invention's own, specially provided tools.

WO9839698, issued Sep. 11, 1998, discloses a method for graphically describing the functionality of a program by generating at least one descriptive diagram. The diagram is then used to further generate a working model of the program by expressing the diagram in an intermediate modelling language. The behaviour of the working model can be quickly and easily changed by modifying the diagrams until the desired result is achieved. Source code is then generated from the object modelling language and compiled to create the final program. This is once again via a specially developed tool. The whole process is encapsulated with the invention's development environment.

Accordingly the invention provides a method for creating a data file using a programming development environment on a computer system, said method comprising the steps of: building a program in said development environment to represent said data file; compiling the program in said development environment into a software executable; and running the executable to generate the data file.

According to the preferred embodiment the program is built by linking a plurality of development components and at least one component comprises characteristic data file information. On running the executable, at least one compiled component outputs its respective data file information into the data file. It does this by creating a file output stream and writing its respective data file information to the output stream. The at least one compiled component also causes another component to output its respective data file information into the data file.

According to the preferred embodiment the development components are Java beans and comprise an icon to permit their representation within visual development tools or environments. The development components comprise a main component, representing a form and a sub-component, representing a text field on the form. The use of a visual development environment to represent the data file means that it is possible to visualise the complex relationships between the various components. The process of creating and debugging the data files is thus a much simpler one.

In the preferred embodiment the program is compiled by generating an executable component from each development component and linking the executable components together. On running a first executable component, data file information from the first executable is output before running the next and subsequent executable components.

The data file itself, according to the preferred embodiment, comprises mark-up information and this may be XML based. A third party computer system interprets this file and this system may be a dialogue management system for a computer telephony system.

In a further aspect the invention provides a system for creating a data file using a programming development environment on a further computer system, said system comprising: means for building a program in said development environment to represent said data file; means for compiling the program in said development environment into a software executable; and means for running the executable to generate the data file.

In a yet still further aspect the invention provides a computer program product comprising computer program code stored on a computer readable storage medium for creating a data file using a programming development environment, said computer program product comprising: means for building a program in said development environment to represent said data file; means for compiling the program in said development environment into a software executable; and means for running the executable to generate the data file.

The invention provides a method of using the existing visual programming tools and environment to automatically generate the textual definitions for the forms. This is more financially sound than making further huge investments in yet another generation of tools.

According to the preferred embodiment, allowing the beans to generate these data files not only isolates the application developer from the syntax of the data files but also in some measure from the actual dialogue management technology being used. By shipping an updated set of beans classes and rerunning the software component it is possible to generate a completely different data file syntax without the need to do anything to the actual application definition. Such isolation allows the dialogue management technology to start simple and to grow over time adding new features and capabilities including even a new definition syntax.

BRIEF DESCRIPTION OF THE DRAWINGS

A preferred embodiment of the invention will now be described in detail by way of example only with reference to the following drawings.

DESCRIPTION OF THE PREFERRED EMBODIMENT

Figure 5:
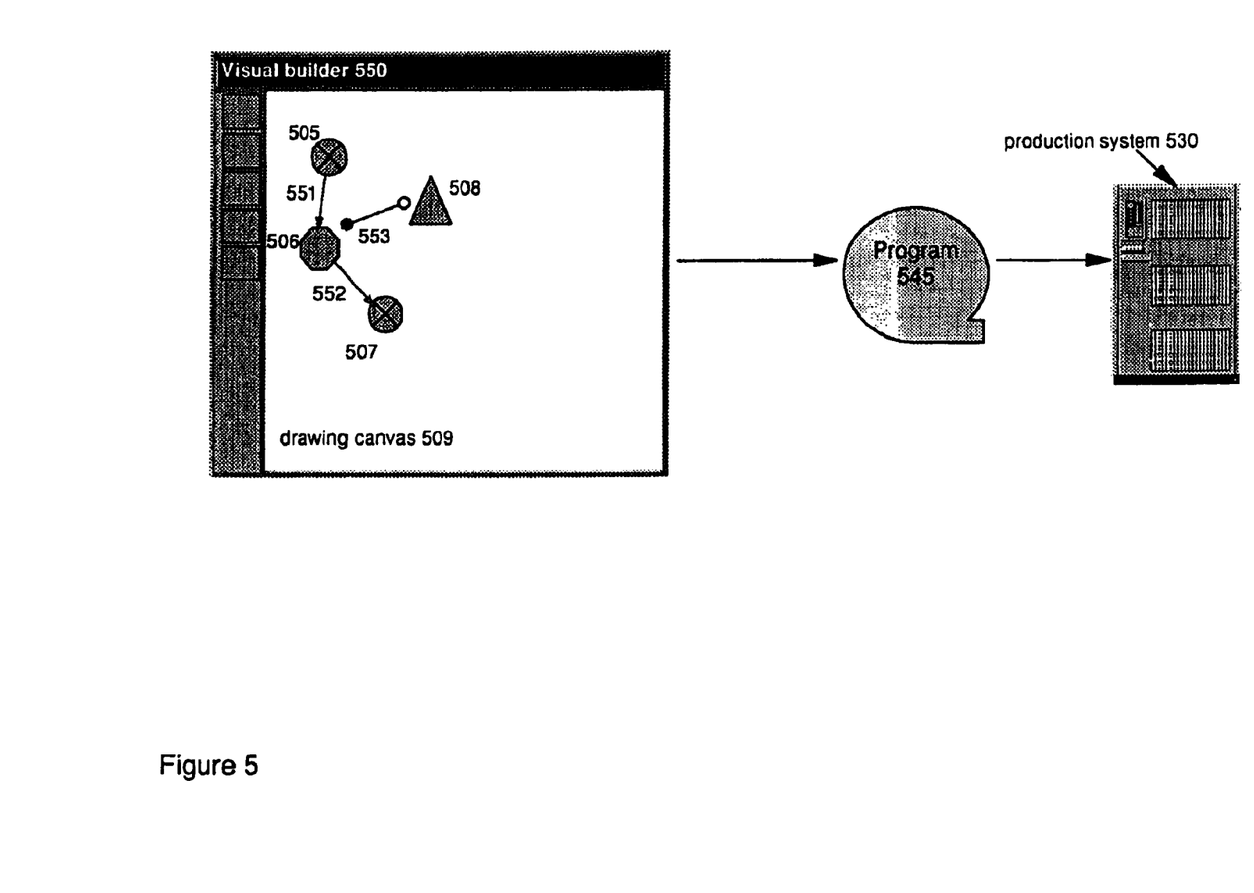
FIG. 5 shows the conventional way in which visual development environments are utilised.

With respect to FIG. 5, a conventional way in which visual development environments are utilised is shown. The visual builder tool 550 creates an executable program 545 which is installed and then run on the production system 530. This application 545 is built from a number of software components 505–508 graphically represented on the drawing canvas 509. Event connections 551, 552 and property connection 553 illustrate the relationship between each of these components and define the program execution flow. Thus in the example, component 505 raises an event which causes execution of component 506 as defined by event connection 551. If the application under construction in FIG. 5 is a voice response application providing some from of auditory interface to the user via a telephone, then component 506 might "speak" a currency value such as a customer's bank balance. Property connection 553 connects a component 508 containing the currency value to the rendering component 506.

Such a graphical layout means that it is relatively simple for an observer to grasp how the program fits together. All aspects of user interface or presentation and business logic are dealt with and the application is thus a self-contained entity or closely related to other such applications.

Figure 6:
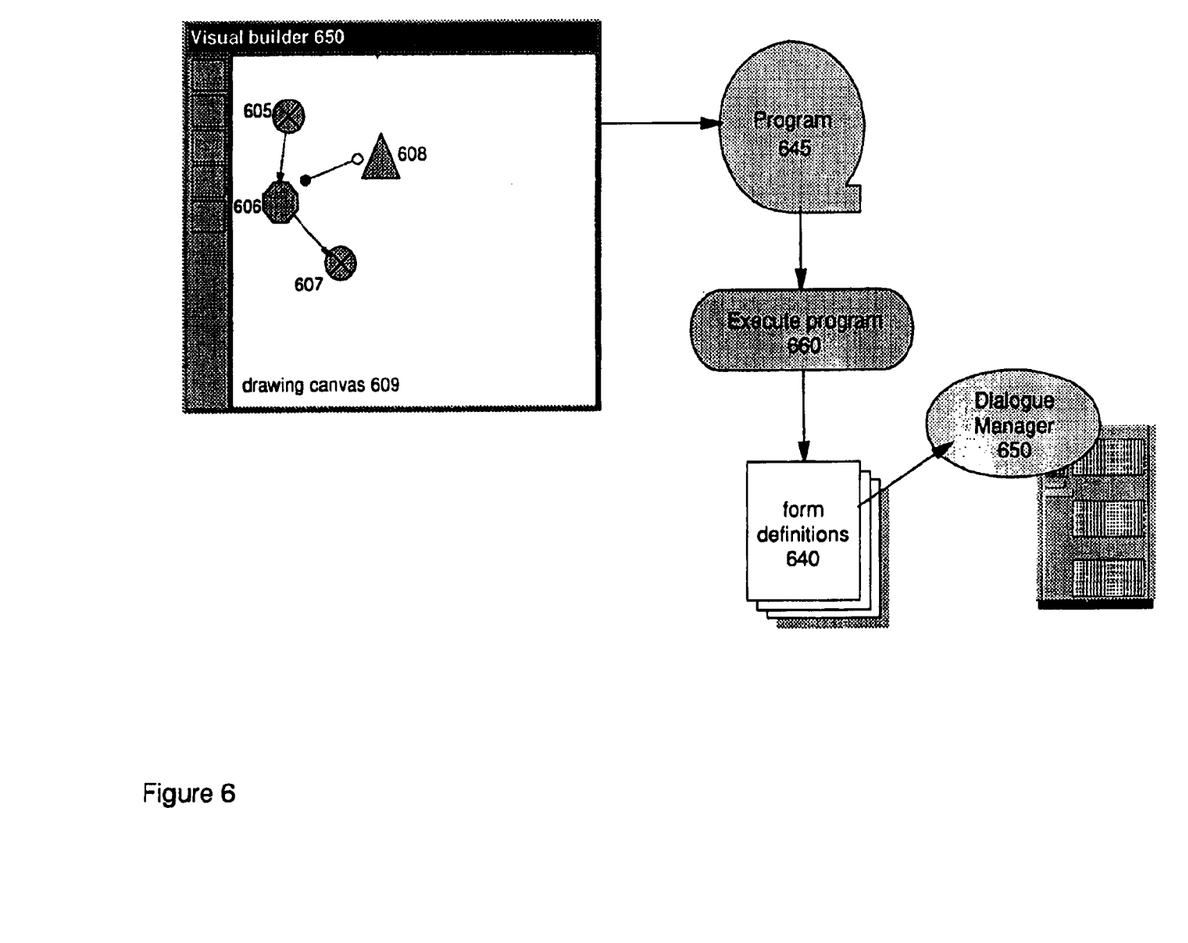
FIG. 6 illustrates a conceptual overview of the development process according to a preferred embodiment of the present invention.

FIG. 6 shows a conceptual overview of the development process according to a preferred embodiment of the present invention. The application generator, and not the application itself is created using the visual builder 650. The executable program 645 from the development process is run (step 660) in order to generate a set of forms definitions (form data files) 640. These are then presented to the runtime dialogue manager 650 for it to interpret.

According to the preferred embodiment, the development environment is IBM VisualAge for Java and each "form" is created as a Java Bean component containing a number of constituent parts (ie fields). Each form and its constituent parts have a number of properties that define its runtime behaviour. When the program produced is executed (step 660) it does not perform the task of the final application but merely creates the textual definition of the forms required by the Dialogue Manager.

Figure 7:
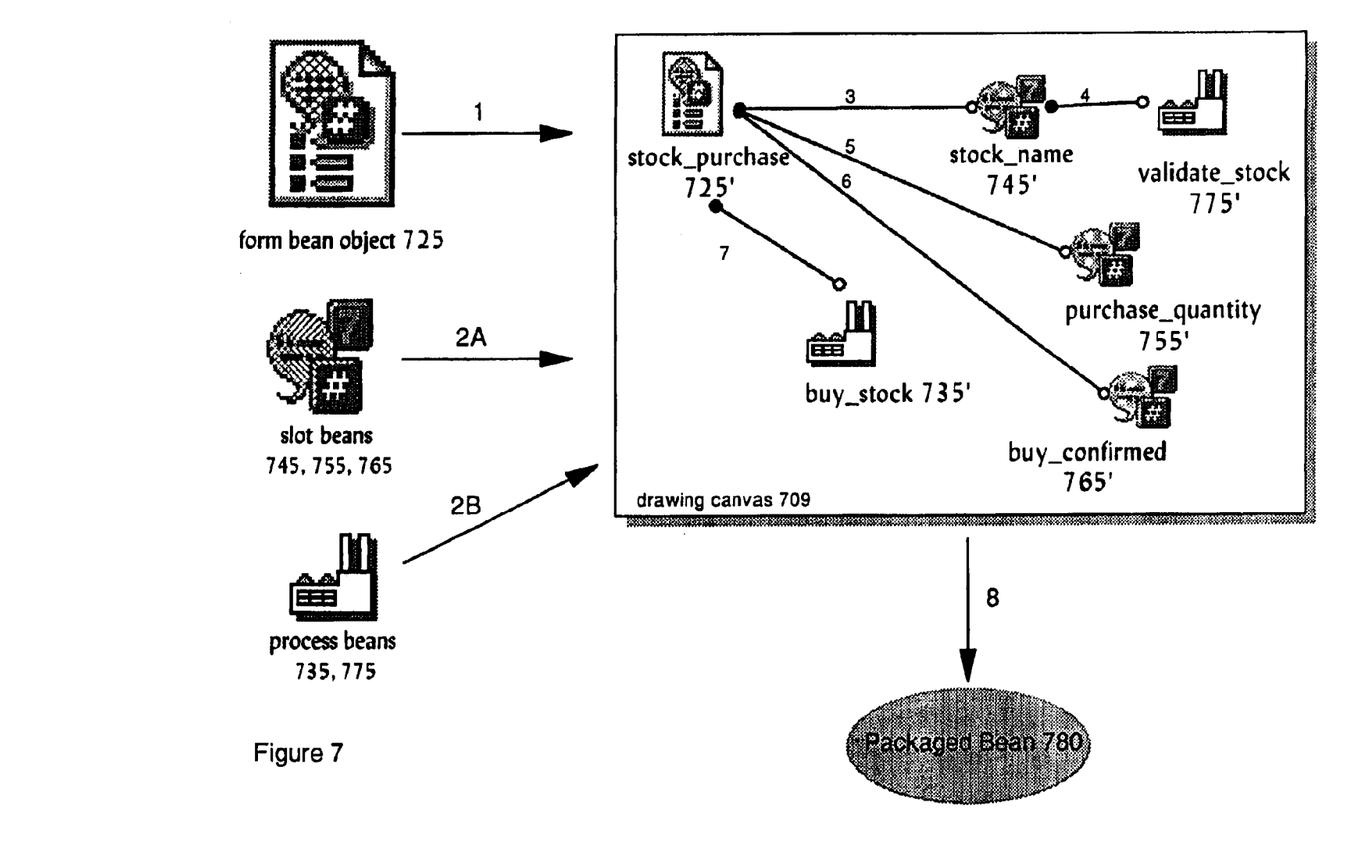
FIG. 7 shows the development process of a packaged Java Bean which when executed generates the textual definitions for a single form according to a preferred embodiment of the present invention.

FIG. 7 shows the development process for a packaged Java Bean which when executed generates the textual definitions for a single form according to a preferred embodiment of the present invention. In the preferred embodiment, each form refers to a business transaction involving stocks and a set of related forms comprise the final form set. At least one form is created per transaction and each form comprises multiple Java Bean components pertaining to the form fields. The forms themselves are simply responsible for structuring the information that the back-end systems need in order to complete a particular transaction (eg to buy stock or sell it). Each of the forms in the final set may inherit information from the other forms in the set. This figure should be read in conjunction with FIG. 3 which illustrates a partial picture of the form definitions that this bean produces.

According to the preferred embodiment, the component beans which constitute the overall bean package 780 are created. This involves conventional Java programming techniques and a smart development environment, In the present case IBM Visual Age for Java can do much of the work regarding the creation of these beans.

Firstly a form bean is created. Each of the forms in the set are defined separately. According to the preferred embodiment, the form being defined is one for a "stock purchase" 725 and this is achieved by sub-classing "Object" and dragging a form bean to the drawing canvas 709 725' (arrow 1). Note, "Object" constitutes the top-level class from which all subsequent objects are derived. In an alternative preferred embodiment, this is achieved by sub-classing a convenient form base class.

A number of slot beans 745, 755, 765 are associated with the form bean 725' and are dragged to the drawing canvas (arrow 2A) 745', 755', 765'. A slot bean represents a piece of information to be obtained from or presented to the user. Associations are created via property connections 3, 5, 6. According to the preferred embodiment, these slot beans comprise:
i) stock_name 745
ii) purchase_quantity 755
iii) buy_confirmed 765

The Java class/bean wrappers for the back-end/business object transactions are also created 735, 775 (ie a set of process beans) and dragged to the drawing canvas (arrow 2B). According to the preferred embodiment, they implement a defined interface, enabling full use to be made of these back-end beans. Alternatively, they can inherit from a provided base class. A Java interface provides the means by which unrelated objects or beans may interact with one another. All beans implementing such an interface agree to a particular type of behaviour (analogous to protocols). Such an interface defines a plurality of methods, however it does not implement these. A method permits a business object (ie bean) to implement its behaviour (ie do something).

Each of these process beans has implementations of the methods of this interface. One particular method, when called, will process the transaction with the relevant back-end systems using a series of string parameters obtained via the form and slot beans. These systems will most likely be powerful mainframes such as the System 390, available from the IBM Corporation.

Thus process beans are created for transactions such as:
i) Stock purchase;
ii) Obtaining a stock quote; and
iii) Selling stock The particular examples illustrated in FIG. 7 are "buy_stock" 735 and "validate_stock" 775. The back-end transactions are also associated via property connections 7 and 4 with the form and/or the slots.

A bean's properties define its behaviour and these can be customised. Such properties may be edited through the visual builder and typically will be displayed in a property sheet.

For more specialised objects, properties may be created/edited through specially developed property editors and/or customisers. Producing such editors/customisers involves the use of conventional programming techniques.

According to the preferred embodiment, each of the component beans has a plurality of properties associated with them. The form bean has the following properties:
i) name—This is the string name of the form as output in the created form definition. With reference to FIG. 3, this definition is <form name=stock_purchase>.
ii) prompts—An array of string identifiers for the prompts to play to the user. Referring again to FIG. 3, Sp1 (ie <prompt id=sp1>) is an example of one such identifier.
iii) slots—The slot beans defined in the form. Ie "stock_name" and "purchase_quantity". These are added via property association lines discussed earlier.
iv) newSlot—When set this permits the addition of a new slot bean to the form.
v) verifier—The business object or process bean which will be used to verify the validity of the combination of all the slots input. This verifier implements a known interface, within which sits the method "verifyData".
vi) processor—The business object (eg "buy_stock" 735) which will be used to transact the business of the form. This business object performs this transaction via another known method, "processForm", also defined within the known interface.

According to the preferred embodiment, a slot bean has the following properties:
i) name—The string name of the slot as output in the created form definition. With reference to FIG. 3, these definitions are <slot name=stock_name> and <slot name=purchase_quantity>. To reiterate, "Stock_name" and "purchase_quantity" are the identifiers defined by the form bean's "slot" property.
ii) prompts—An array of string identifiers for the prompts to play to the user. Sp11 (ie <prompt id=sp11>) and Sp111 (<prompt id=sp111>) are two examples of such identifiers.
iii) verifier—The business object or process bean (eg the "validate_stock" process bean 775) which will be used to verify the validity of input to a particular slot. Once again, this verifier will be called via the "verifyData" method (from within the known interface), and will perform verification.

According to the preferred embodiment the known interface discussed above is the BusinessObject interface. It is the interface implemented by all verifier and processor objects. An example of what a declaration of this might look like is given below:

```
public interface BusinessObject
{
    public int verifyData (Object formOrSlot);
    public int processForm (Object form);
```

```
        public static final int OK = 0;
        public static final int BAD = -1;
}
```

The "verifyData" method is called when a slot or form wishes to verify the validity of the data currently within it. The formOrSlot parameter provides a reference to the form or slot requiring verification. The verifier may access the properties of the referenced form or slot to obtain the current value. A return value of BusinessObject.OK indicates that the current value is valid. Any non-zero return value indicates that the current value is invalid. The verifier may also attach particular meanings to the returned value.

The "processForm" method is called to transact the business of a form. The form parameter provides a reference to the form to be processed. The processor may access the properties of the form, including its associated slot objects, in order to obtain any information necessary. A return value of BusinessObject.OK indicates that processing was performed successfully. Any non-zero return value indicates a processing failure. The processor may attach particular meanings to the returned value.

According to the preferred embodiment, the process beans also have a plurality of properties associated with them. They have a "name" property to define the string name of the process as output in the created form definition. With reference to FIG. 3, an example of one such definition is <name>buy_stock</name>. Other properties may be defined to permit specialisation of the run-time behaviour associated with the process or verification.

The properties discussed above, enable each of the component beans to produce their part of the overall definition for the "stock_purchase" form. In an alternative embodiment, the properties are hard-coded and are not customised via property editors/customisers. According to the preferred embodiment, once the definition of the form is complete, it is packaged as a bean 780 (arrow 8) using the facilities of the builder environment and thus becomes available for use in creating higher-level structures (ie for association with other transactional forms). When executed, the packaged bean creates markup relating to the single form (in this case, the stock_purchase form).

Figure 8:
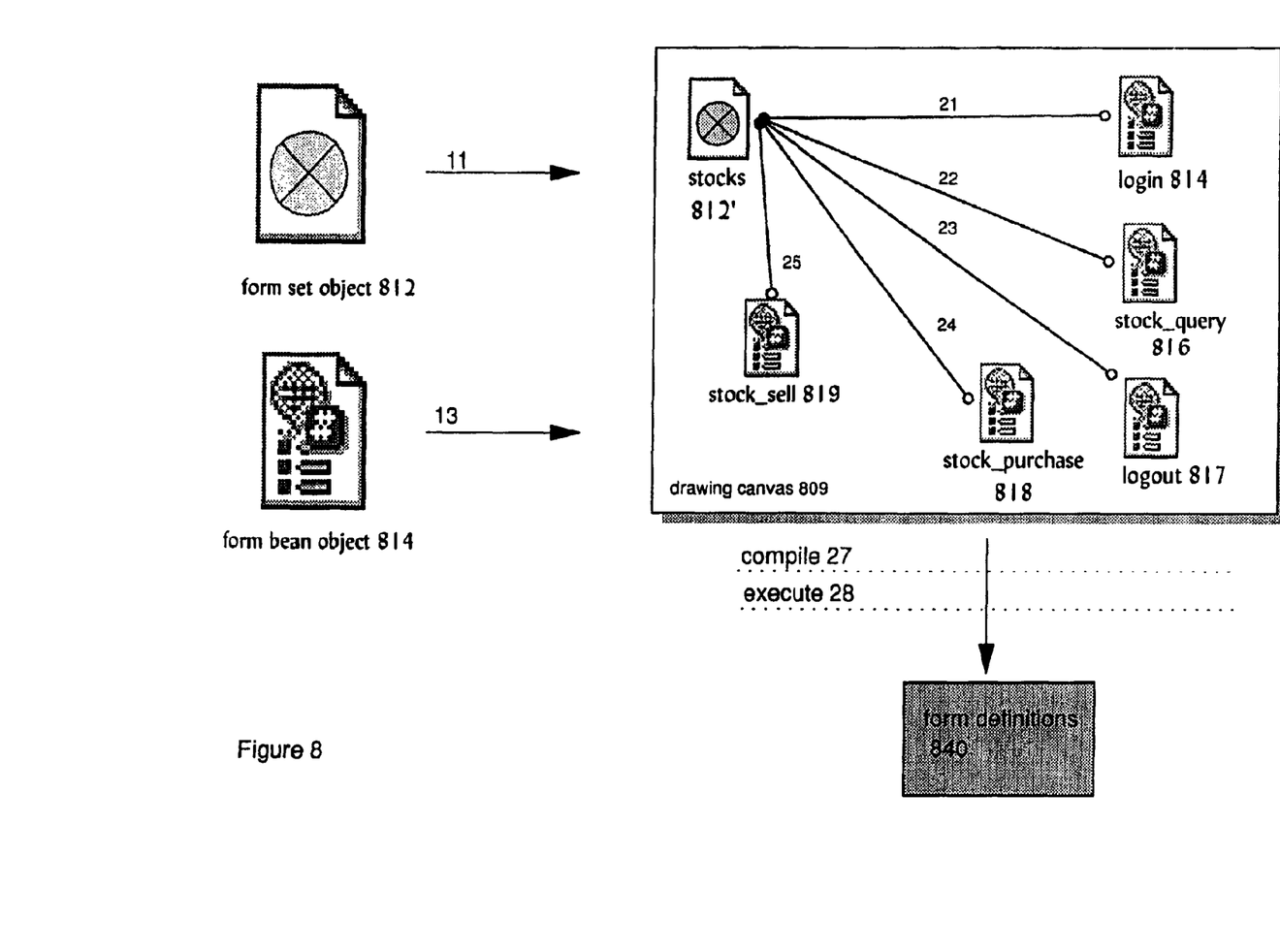
FIG. 8 depicts the amalgamation of a full set of form beans into a form set, according to a preferred embodiment of the present invention.

When a full set of form beans has been created, then these are amalgamated into a form set. FIG. 8 illustrates this process and it is essentially the same as for the creation of the individual forms.

According to the preferred embodiment, the form set object 812 is dragged to the drawing canvas 809 (arrow 11). According to the preferred embodiment, this is given the all encompassing name of "stocks" 812'. The form bean objects (one shown) 814 are also dragged (arrow 13) to the canvas 809. In the preferred embodiment, these are as follows:
i) login 814
ii) stock_purchase 818
iii) stock_query 816
iv) stock_sell 819
v) logout 817
These form beans are associated with the "stock" form set object 812' on the canvas via property connectors 21–25.

When the set of forms that comprise the overall program is complete, it is compiled (step 27) and executed (step 28). According to the preferred embodiment, an executable application made up of the supplied Java Beans is created. The pre-defined behaviour of these beans is such that when the application is executed it results in the creation of a data file containing some form of markup (ie form definition files 840) which the dialogue manager of the runtime system understands.

According to the preferred embodiment, all the supplied beans (form set, form and slot) implement an "outputMarkup" method and further that the form and form set beans implement a Java "main" method that allows them to be executed as an application. Referring back to FIG. 7, the execution flow of the application described by that figure is as follows:
1. The application or packaged bean 780 is executed by invoking the "main" method of the application.
2. The "main" method creates a file output stream and invokes the "outputMarkup" method of the form bean (725) passing the stream as a parameter.
3. The form bean writes to the output stream the start of it's markup;

```
<form name=stock_purchase>
        <prompt id=sp1>"Please provide the name of the stock and
                quantity you wish to purchase"</prompt>
```

4. The first bean (745) defined by the form's "slots" property is identified and it's "outputMarkup" method is invoked again passing the stream as a parameter.
5. The bean writes it's markup to the output stream;

```
<slot name=stock_name>
        <prompt id=sp11>"Which stock do you wish to buy?"</prompt>
        <process>
                <name>validate_stock</name>
                <response value=1>
                        <prompt id=sp111>"Sorry, I don't
                            recognise that stock"</prompt>
                </response>
        </process>
</slot>
```

6. The remaining beans (755, 765) defined by the "slots" parameter are called in a similar manner and write out their markup;
7. The form bean (725) writes out the remainder of it's markup;

```
<process>
        <name>buy_stock</name>
</process>
</form>
```

8. Control is returned to the "main" method which closes off the file and terminates.
Thus the resulting data file contains the markup as illustrated by FIG. 3.

Although the invention has been described in the context of form definition or data files for interpretation by a dialogue management system, it should be understood that the invention is not limited to such. It is just as applicable to the generation of any data files which define the relationship between a plurality of entities and it should be further understood that these data files could be for interpretation by a computer system other than a Dialogue Manager. Furthermore, the invention is not limited to the Java implementation described herein, but could be written in another component based programming language.

What is claimed is:

1. A method for creating a data file using a programming development environment on a computer system, said method comprising the steps of:
building a program in said development environment to represent said data file;
compiling the program in said development environment into a software executable; and
running the executable to generate the data file containing definition files which are interpreted by a third party computer system for future application execution, and the third party computer system comprises a dialogue management system for a computer telephony system.

2. The method of claim 1 wherein the program is built by linking a plurality of development components.

3. The method of claim 2 wherein at least one component comprises characteristic data file information.

4. The method of claim 3 wherein on running the executable, at least one compiled component outputs its respective data file information into the data file.

5. The method of claim 4 wherein on running the executable, at least one compiled component creates a file output stream and writes its respective data file information to the output stream.

6. The method of claim 4 wherein on running the executable, at least one compiled component causes another component to output its respective data file information into the data file.

7. The method of claim 2 wherein at least one development component comprises a graphical icon for a visual development graphical user interface.

8. The method of claim 2 wherein the development components are Java beans.

9. The method of claim 2 wherein the development components comprise a main component and a sub-component.

10. The method of claim 9 wherein the main development component represents a form.

11. The method of claim 10 wherein the sub-component represents a text field on the form.

12. The method of claim 2 wherein the program is compiled by generating an executable component from each development component and linking the executable components together.

13. The method of claim 12 wherein on running a first executable component, data file information from the first executable is output before running the next and subsequent executable components.

14. The method of claim 1, wherein the data file comprises mark-up information.

15. The method of claim 14, wherein the mark-up information comprises XML.

16. A system for creating a data file using a programming development environment on a further computer system, said system comprising:
means for building a program in said development environment to represent said data file;
means for compiling the program in said development environment into a software executable; and
means for running the executable to generate the data file containing definition files which are interpreted by a third party computer system for future application execution, and the third party computer system comprises a dialogue management system for a computer telephony system.

17. The system of claim 16 wherein the program is built by linking a plurality of development components.

18. The system of claim 17 wherein at least one component comprises characteristic data file information.

19. The system of claim 18 wherein on running the executable, at least one compiled component outputs its respective data file information into the data file.

20. The system of claim 19 wherein on running the executable, at least one compiled component creates a file output stream and writes its respective data file information to the output stream.

21. The system of claim 19 wherein on running the executable, at least one compiled component causes another component to output its respective data file information into the data file.

22. The system of claim 17 wherein at least one development component comprises a graphical icon for a visual development graphical user interface.

23. The system of claim 17 wherein the development components are Java beans.

24. The system of claim 17 wherein the development components comprise a main component and a sub-component.

25. The system of claim 24 wherein the main development component represents a form.

26. The system of claim 25 wherein the sub-component represents a text field on the form.

27. The system of claim 17 wherein the program is compiled by generating an executable component from each development component and linking the executable components together.

28. The system of claim 27 wherein on running a first executable component, data file information from the first executable is output before running the next and subsequent executable components.

29. The system of claim 16, wherein the data file comprises mark-up information.

30. The system of claim 29, wherein the mark-up information comprises XML.

31. A computer program product comprising computer program code stored on a computer readable storage medium for, creating a data file using a programming development environment, said computer program product comprising:
means for building a program in said development environment to represent said data file;
means for compiling the program in said development environment into a software executable; and
means for running the executable to generate the data file containing definition files which are interpreted by a third party computer system for future application execution, and the third party computer system comprises a dialogue management system for a computer telephony system.

* * * * *